US008040903B2

(12) United States Patent
McGee et al.

(10) Patent No.: US 8,040,903 B2
(45) Date of Patent: Oct. 18, 2011

(54) AUTOMATED CONFIGURATION OF POINT-TO-POINT LOAD BALANCING BETWEEN TEAMED NETWORK RESOURCES OF PEER DEVICES

(75) Inventors: Michael Sean McGee, Round Rock, TX (US); Mark Richard Enstone, Austin, TX (US); Mark Christopher Stratton, Georgetown, TX (US); Christopher L. Hughes, Round Rock, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1972 days.

(21) Appl. No.: 11/048,522

(22) Filed: Feb. 1, 2005

(65) Prior Publication Data
US 2006/0187928 A1 Aug. 24, 2006

(51) Int. Cl.
*H04L 12/28* (2006.01)
(52) U.S. Cl. .................................. 370/401; 370/390
(58) Field of Classification Search .................. None
See application file for complete search history.

(56) References Cited

U.S. PATENT DOCUMENTS

| | | | | |
|---|---|---|---|---|
| 6,272,113 B1* | 8/2001 | McIntyre et al. | ............ | 370/248 |
| 6,556,541 B1* | 4/2003 | Bare | ............ | 370/235 |
| 7,487,243 B1* | 2/2009 | Zielinski et al. | ............ | 709/226 |
| 2003/0195938 A1* | 10/2003 | Howard et al. | ............ | 709/208 |
| 2003/0210686 A1* | 11/2003 | Terrell et al. | ............ | 370/389 |
| 2004/0010616 A1* | 1/2004 | McCanne | ............ | 709/238 |
| 2004/0268358 A1* | 12/2004 | Darling et al. | ............ | 718/105 |
| 2005/0058063 A1* | 3/2005 | Masuyama et al. | ............ | 370/217 |
| 2005/0111474 A1* | 5/2005 | Kobayashi | ............ | 370/432 |

* cited by examiner

*Primary Examiner* — Phirin Sam

(57) ABSTRACT

A plurality of peer network devices are configured to load-balance data transmitted between them on a point-by-point basis. Each peer device has a team of network resources coupling it to a local area network. A peer device transmitting data to one of the other peer devices load-balances the data over the team of resources of the receiving one of the peer devices. Each peer device multicasts to the other peer devices a data frame from that includes peer data defining attributes of the team of the multicasting peer device. The multicast data frame is updated with new peer data whenever one or more of the attributes of the team of the multicasting peer device are changed.

31 Claims, 10 Drawing Sheets

AUTOMATED CONFIGURATION OF POINT-TO-POINT LOAD BALANCING BETWEEN TEAMED NETWORK RESOURCES OF PEER DEVICES

BACKGROUND

This application claims the benefit of priority under U.S.C. §120 from U.S. patent application Ser. No. 10/917,677, filed Aug. 13, 2004.

Computers and other devices are commonly interconnected to facilitate communication among one another using any one of a number of available standard network architectures and any one of several corresponding and compatible network protocols. One of the most commonly employed of such standard architectures is the Ethernet® network architecture. Other types of network architectures that are less widely used include ARCnet, Token Ring and FDDI. Variations of the Ethernet® standard are differentiated from one another based on characteristics such as maximum throughput (i.e. the highest data transmission rate) of devices coupled to the network, the type of medium used for physically interconnecting the devices (e.g. coaxial cable, twisted pair cable, optical fibers, etc.) and the maximum permissible length of the medium. Ethernet® is a registered trademark of Xerox Corporation.

Packet switched network protocols are commonly employed with architectures such as the Ethernet® standard. These protocols dictate the manner in which data to be transmitted between devices coupled to the network are formatted into packets for transmission. One commonly used protocol is the Transmission Control Protocol/Internet Protocol (TCP/IP). TCP/IP is typically used in Internet applications, or in intranet applications such as a local area network (LAN). The data packets received through a network resource of the destination device are processed in reverse according to the selected protocol to reassemble the payload data contained within the received packets. In this manner, computers and other devices can share information in accordance with these higher level protocols over the common network.

One of the most basic and widely implemented networks is the Local Area Network (LAN). In its simplest form, a LAN is a number of devices (e.g. computers, printers and other specialized peripherals) connected to one another by some form of signal transmission medium such as coaxial cable to facilitate direct peer-to-peer communication there between. A common network paradigm, often employed in LANs as well as other networks, is known as the client/server paradigm. This paradigm involves coupling one or more large computers (typically having very advanced processing and storage capabilities) known as servers to a number of smaller computers (such as desktops or workstations) and other peripheral devices shared by the computers known as clients. The clients send requests over the network to the one or more servers to facilitate centralized information storage and retrieval through programs such as database management and application programs stored on the server(s). Servers may also be used to provide centralized access to other networks and various other services as are known to those of skill in the art. The servers provide responses over the network to the clients in response to their requests. Clients and/or servers can also share access to peripheral resources, such as printers, scanners, and the like over the network.

LANs are often coupled together to form even larger networks, such as wide area networks (WANs), or they may be coupled to the Internet. LANs may also be segmented into logical sub-networks called virtual LANs (VLANs), and a particular network device's access to the segments is controlled by a switch that can be programmed in real time to couple network resources of that device to one, some or all of the VLAN segments.

Network interface resources are required to couple computers and other devices to a network. These interface resources are sometimes referred to as network adapter cards or network interface cards (NICs), each adapter card or NIC having at least one port through which a physical link is provided between the network transmission medium and the processing resources of the network device. Data is communicated (as packets in the case of packet switched networks) from the processing resources of one network device to the other. The data is transmitted and received through these interface resources and over the media used to physically couple the devices together. Adapter cards or NICs are commercially available that are designed to support one or more variations of standard architectures and known topologies.

Each of the network devices typically includes a bus system through which the processing resources of the network devices may be coupled to the NICs. The bus system is usually coupled to the pins of edge connectors defining sockets for expansion slots. The NICs are coupled to the bus system of the network device by plugging the NIC into the edge connector of the expansion slot. In this way, the processing resources of the network devices are in communication with any NICs or network adapter cards that are plugged into the expansion slots of that network device. As previously mentioned, each NIC or network adapter must be designed in accordance with the standards by which the network architecture and topology are defined to provide appropriate signal levels and impedances (i.e. the physical layer) to the network. This of course includes an appropriate physical connector for interfacing the NIC to the physical transmission medium employed for the network (e.g. coaxial cable, twisted-pair cable, fiber optic cable, etc.).

It is desirable that certain connections (e.g. access by clients to network server(s)) be as reliable as possible. It is also desirable that some network devices (e.g. network server(s)) be able to receive and respond to numerous incoming requests from other devices on the network (such as clients) as quickly as possible. As processing speed continues to increase and memory access time continues to decrease for a network device such as a server, the bottleneck for device throughput becomes pronounced at the interface to the network. While network architectures and associated network adapters are being designed to handle ever-increasing throughput rates, the price for implementing interface resources supporting the highest available throughput is not always cost-effective.

In light of the foregoing, it has become common to improve the reliability and throughput of a network by coupling some or all of the network devices to the network through redundant network resources. These redundant links to the network may be provided as a team by a plurality of single-port NMCs, a single NIC having more than one port or a combination thereof. Teaming of network interface resources is particularly common for servers, as the demand for throughput and reliability is typically greatest for servers on a network. Resource teams are typically two or more NICs (actually two or more NIC ports) logically coupled in parallel to appear as a single virtual network adapter to the other devices on the network. These resource teams can provide aggregated throughput of data transmitted to and from the network device employing the team and/or fault tolerance (i.e. resource redundancy to increase reliability).

Fault tolerant teams of network resources commonly employ two or more network adapter or NIC ports, one port being "active" and designated as the "primary," while each of the other members of the team are designated as "secondary" and are placed in a "standby" mode. A NIC or NIC port in standby mode remains largely idle (it is typically only active to the limited extent necessary to respond to system test inquiries to indicate that it is still operational) until activated to replace the primary adapter when it has failed. In this way, interruption of a network connection to a critical server may be avoided notwithstanding the existence of a failed network adapter card or port.

SUMMARY OF THE INVENTION

Embodiments of the invention automatically configure each of a plurality of peer network devices to load-balance data transmitted therebetween on a point-by-point basis. Each peer device has a team of network resources coupling it to a local area network. The transmitting one of the peer devices load-balances the data to be transferred over its team of resources as well as the team of resources comprising the receiving one of the plurality. The method includes multicasting a data frame from each of the peer devices to the other peer devices of the plurality, where the data frame includes peer data defining attributes of the team of the multicasting peer device. The method further includes updating the multicast data frame with new peer data whenever one or more of the attributes of the team of the multicasting peer device are changed.

BRIEF DESCRIPTION OF THE DRAWINGS

For a detailed description of embodiments of the invention, reference will now be made to the accompanying drawings in which.

NOTATION AND NOMENCLATURE

Certain terms are used throughout the following description and in the claims to refer to particular features, apparatus, procedures, processes and actions resulting therefrom. For example, the term network resources is used to generally denote network interface hardware such as network interface cards (NICs) and other forms of network adapters known to those of skill in the art. Moreover, the term NIC or network adapter may refer to one piece of hardware having one port or several ports. While effort will be made to differentiate between NICs and NIC ports, reference to a plurality of NMCs may be intended as a plurality of interface cards or as a single interface card having a plurality of NIC ports. Those skilled in the art may refer to an apparatus, procedure, process, result or a feature thereof by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . . ."

DETAILED DESCRIPTION

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to intimate that the scope of the disclosure, including the claims, is limited to that embodiment. For example, while the various embodiments may employ one type of network architecture and/or topology, those of skill in the art will recognize that the invention(s) disclosed herein can be readily applied to all other compatible network architectures and topologies.

Figure 1:
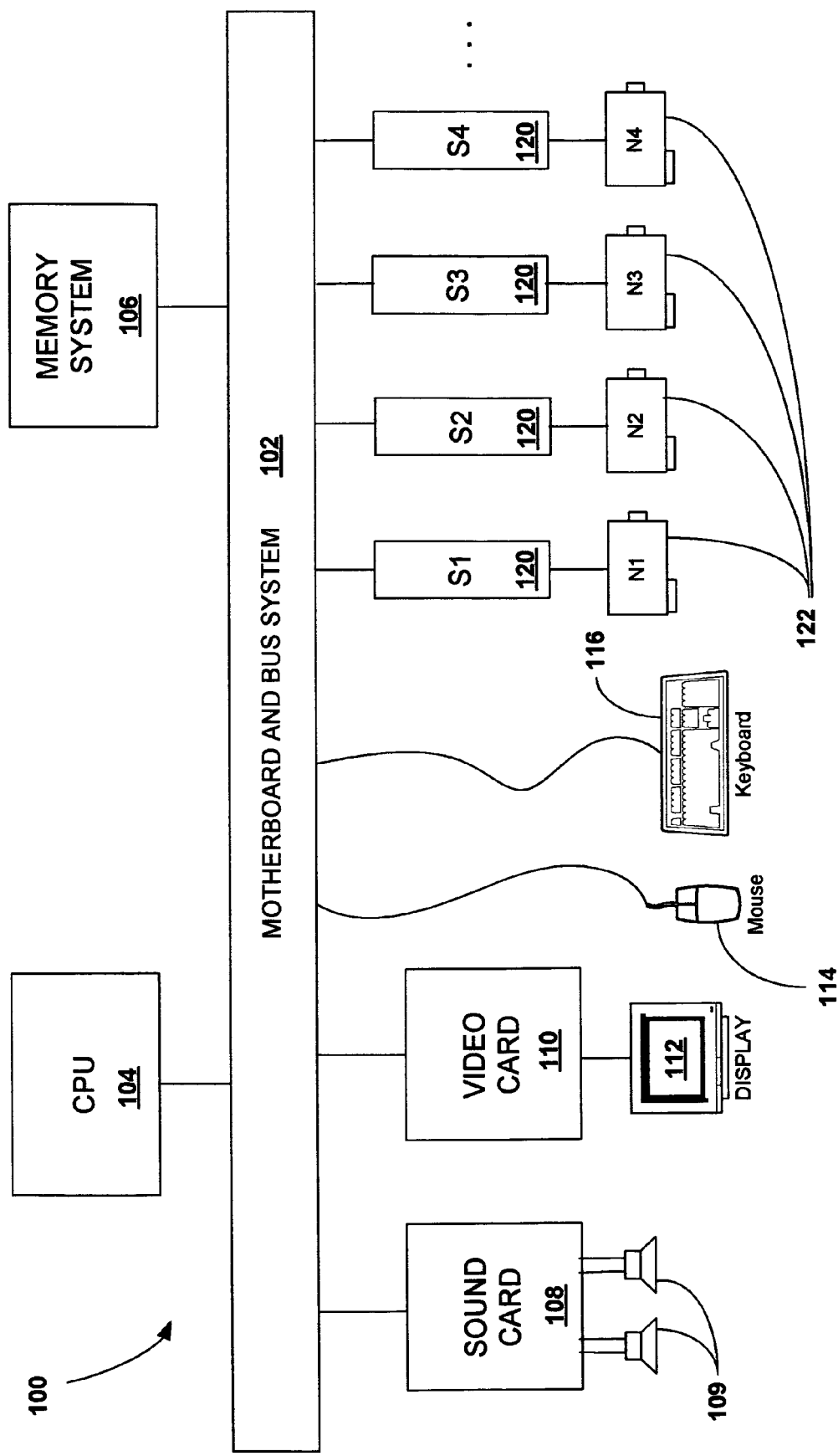
FIG. 1 is a block diagram that illustrates various features of a computer system, including some features by which the computer system may be coupled to a network by employing features of an embodiment of the invention.

FIG. 1 is a block diagram of a computer system 100 that illustrates various features of a computer system 100, including some of those features used to couple it to a network in accordance with an embodiment of the present invention. The computer system 100 can be an IBM-compatible, personal computer (PC) system or the like, and may include a motherboard and bus system 102 coupled to at least one central processing unit (CPU) 104, a memory system 106, a video card 110 or the like, a mouse 114 and a keyboard 116. The motherboard and bus system 102 can be any kind of bus system configuration, such as any combination of the following: a host bus, one or more peripheral component interconnect (PCI) buses, an industry standard architecture (ISA) bus, an extended ISA (EISA) bus, a microchannel architecture (MCA) bus, etc. Also included but not shown are bus driver circuits and bridge interfaces, etc., as are known to those skilled in the art.

The CPU 104 can be any one of several types of microprocessors and can include supporting external circuitry typically used in PCs. The types of microprocessors may include the 80486, Pentium®, Pentium II®, etc. all microprocessors from Intel Corp., or other similar types of microprocessors such as the K6® microprocessor by Advanced Micro Devices. Pentium® is a registered trademark of Intel Corporation and K6® is a registered trademark of Advanced Micro Devices, Inc. The external circuitry can include one or more external caches (e.g. a level two (L2) cache or the like (not shown)). The memory system 106 may include a memory controller or the like and may be implemented with one or more memory boards (not shown) plugged into compatible memory slots on the motherboard, although any memory configuration is contemplated. The CPU 104 may also be a plurality of such processors operating in parallel.

Other components, devices and circuitry may also be included in the computer system 100 that are not particularly relevant to embodiments of the present invention and are therefore not shown for purposes of simplicity. Such other components, devices and circuitry are typically coupled to the motherboard and bus system 102. The other components, devices and circuitry may include an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

The computer system 100 may further include one or more output devices, such as speakers 109 coupled to the motherboard and bus system 102 via an appropriate sound card 108, and monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as is known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration, as further described below.

The motherboard and bus system 102 is typically implemented with one or more expansion slots 120, individually labeled S1, S2, S3, S4 and so on, where each of the slots 120 is operable to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots known to those of skill in the art, such as PCI, ISA, EISA, MCA, etc. In an embodiment illustrated in FIG. 1, a plurality of NIC adapter cards 122, individually labeled N1, N2, N3 and N4 are shown coupled to the respective slots S1-S4. The bus implemented for slots 120 and the NICs 122 is typically dictated by the design of the adapter card itself.

If employed in a packet-switched network, each of the NICs 122 (N1-N4) of FIG. 1 transmits to and receives from the network, packets (e.g. Ethernet® formatted packets or the like) generated by the processing resources of the transmitting network device. The formatting of the packets is defined by the chosen transmission protocol as previously discussed. It will be understood by those skilled in the art that each device on a network uses one or more unique addresses by which it communicates with the other devices on the network. Each address corresponds to one of the layers of the OSI model and is embedded in the packets for both the source device as well as the destination device. The MAC address can be thought of as being assigned to the physical hardware of the device (i.e. the adapter or NIC port providing the link to the network) whereas the protocol address is assigned to the software of the device. When multiple protocols reside on the same network device, a protocol address is usually assigned to each resident protocol.

For Ethernet® networks, devices communicate directly using their respective MAC (i.e. layer 2) addresses, even though the software for each device initiates communication with one or more other network devices using their protocol addresses. Ethernet® devices must first ascertain the MAC address corresponding to a particular protocol address identifying a destination device. For the IP protocol, this is accomplished by first consulting a cache of MAC address/protocol address pairs maintained by each network device. If an entry for a particular protocol address is not there, a process is initiated whereby the sending device broadcasts a request to all devices on the network for the device having the destination protocol address to send back its MAC address. This is known as ARP (address resolution protocol), the result of which is then stored in the cache. The packets are then formed by embedding the source and destination addresses, which are at least 48 bits, as well as embedding the source and destination protocol addresses in the payload of the packet so that the receiving device knows to which device to respond. For the IPX protocol, the ARP process is not required because the MAC address is a constituent of the IP address.

There are three types of layer 2 and layer 3 addresses. A directed or unicast packet includes a specific destination address that corresponds to a single network device. A multicast address corresponds to a plurality of devices on a network, but not all of them. A broadcast address, used in the ARP process for example, corresponds to all of the devices on the network. A broadcast bit is set for broadcast packets, where the destination address is all ones (1's). A multicast bit in the destination address is set for multicast packets.

Figure 2:
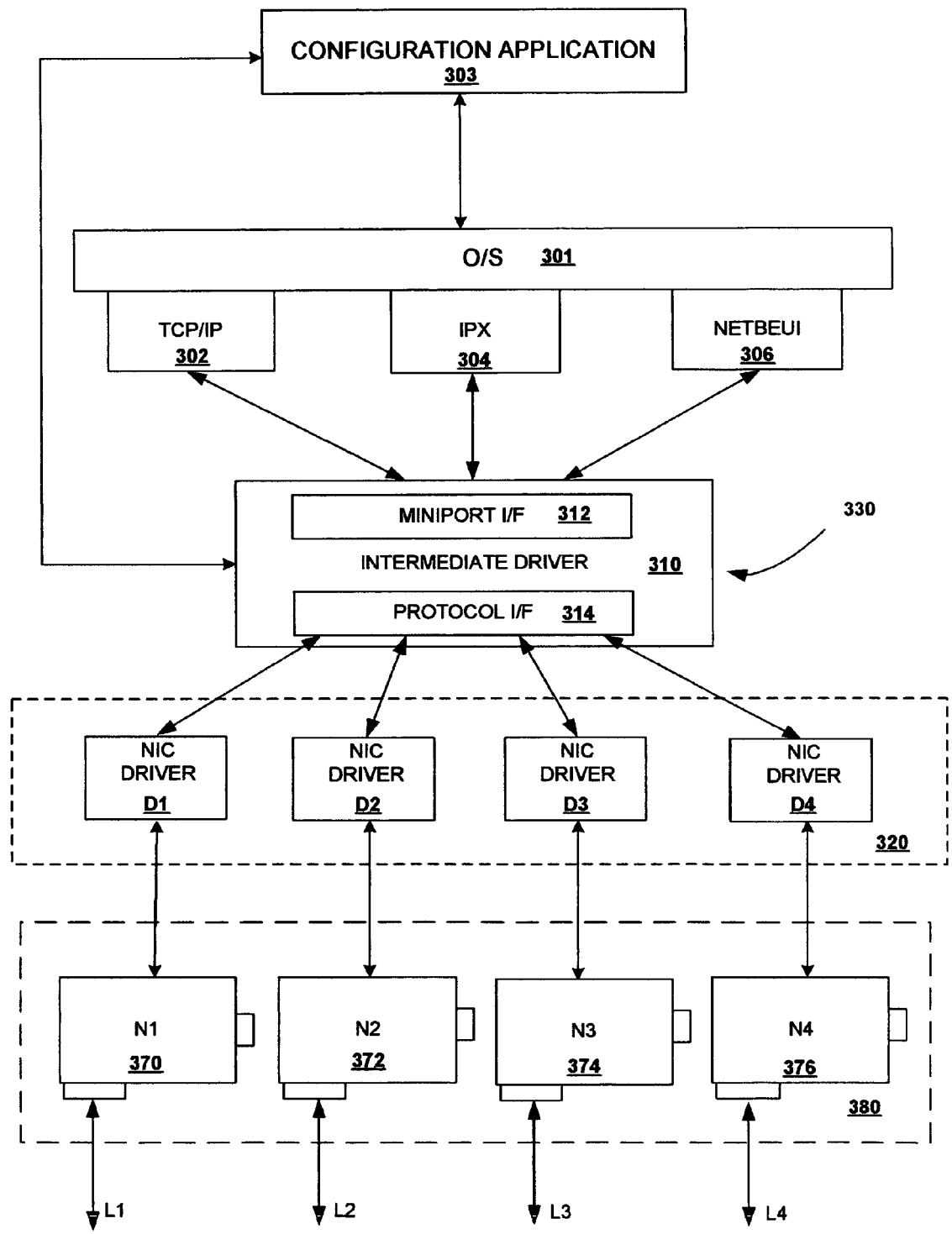
FIG. 2 is a block diagram illustrating some of the components of a controller system installed on the computer system of FIG. 1 and implemented to enable teaming of network resources that may employ features of an embodiment of the invention.

A more detailed discussion regarding the teaming mechanism of an embodiment of the invention is now presented with reference to FIG. 2. As previously mentioned, for a team of network adapter ports to operate as a single virtual adapter, all devices on the network must communicate with the team using only one layer 2 address and one layer 3 address. Put another way, a network device must see only one layer 2 (e.g. MAC) address and one protocol address (e.g. IP, IPX) for a team, regardless of the number of adapter ports that make up the team. For the IP protocol address of an Ethernet network, this means that a team will have only one entry in its ARP table (i.e. one MAC address and one IP address) for the entire team.

FIG. 2 is a block diagram illustrating the primary components of an embodiment of a controller system 300 installed on the computer system 100 that enables teaming of any number of NIC ports to create a single virtual or logical device. In the embodiment shown in FIG. 2, computer system 100 is configured with four NIC drivers D1, D2, D3 and D4 for purposes of illustration. D1-D4 are the drivers necessary to control the four single-port NICs N1 370-N4 376. The computer system 100 has installed within it an appropriate operating system (O/S) 301 that supports networking, such as Microsoft NT, Novell Netware, Windows 2000, or any other suitable network operating system. The O/S 301 includes, supports or is otherwise loaded with the appropriate software and code to support one or more communication protocols, such as TCP/IP 302, IPX (Internet Protocol exchange) 304, NetBEUI (NETwork BIOS End User Interface) 306, etc. Two application programs run in conjunction with O/S 301.

An embodiment of configuration application 303 provides a first graphical user interface (GUI) through which users may program in configuration information regarding the initial teaming of the NICs. Additionally, the configuration application 303 receives current configuration information from the teaming driver 310 that can be displayed to the user using the first GUI on display 112, including the status of the resources for its team (e.g. "failed," "standby" and/or "active"). Techniques for displaying teaming configurations and resource status are disclosed in detail in U.S. Pat. No. 6,229,538 entitled "Port-Centric Graphic Representations of Network Controllers," which is incorporated herein in its entirety by this reference.

A second GUI can be provided through the configuration application through which teaming and load-balancing rules may be enabled or disabled to govern dynamic allocation and configuration of the computer system's teamed NICs based on current network conditions, including current usage of the teamed resources. The second application, resource monitoring and allocation application 600, runs continuously and monitors the status and usage of the system's resources to identify actionable resource usage conditions in response to which it takes action in accordance with the rules that are enabled by the user. The two application programs 303 and 600 provide commands by which the resources are allocated and reconfigured. A user can interact with the configuration program 303 through the GUIs via one or more input devices, such as the mouse 114 and the keyboard 116 and one or more output devices, such as the display 112.

A hierarchy of layers within the O/S 301, each performing a distinct function and passing information between one another, enables communication with an operating system of another network device over the network. For example, four such layers have been added to Windows 2000: the Miniport I/F Layer 312, the Protocol I/F Layer 314, the Intermediate Driver Layer 310 and the Network Driver Interface Specification (NDIS) (not shown). The Protocol I/F Layer 314 is responsible for protocol addresses and for translating protocol addresses to MAC addresses. It also provides an interface between the protocol stacks 302, 304 and 306 interface with the NDIS layer. The drivers for controlling each of the network adapter or NIC ports reside at the Miniport I/F Layer 312 and are typically written and provided by the vendor of the network adapter hardware. The NDIS layer is provided by Microsoft, along with its O/S, to handle communications between the Miniport Driver Layer 312 and the Protocol I/F Layer 314.

To accomplish teaming of a plurality of network adapters, an instance of an intermediate driver residing at the Intermediate Driver Layer 310 is interposed between the Miniport Driver Layer 312 and the NDIS. The Intermediate Driver Layer 310 is not really a driver per se because it does not actually control any hardware. Rather, the intermediate driver makes the group of miniport drivers for each of the NIC ports to be teamed, function seamlessly as one driver that interfaces with the NDIS layer. Thus, the intermediate driver makes the NIC drivers of a team appear to be one NIC driver controlling one NIC port. Prior to the introduction of teaming and the intermediate driver layer 310, a protocol address typically was assigned to each individual network adapter (or NIC) driver at the Miniport Driver Layer 312. In the case of teaming, however, a single protocol address is typically assigned to each instance of the intermediate driver. Thus, the first requirement for teaming has been accomplished with a single protocol address being assigned to each team. For each team of NIC adapter ports, there will be a separate instance of the intermediate driver at the Intermediate Driver Layer 310, each instance being used to tie together those NIC drivers that correspond to the NIC ports belonging to that team.

In this manner, the intermediate driver 310 appears as a single NIC driver to each of the protocols 302-306. Also, the intermediate driver 310 appears as a single protocol to each of the NIC drivers D1-D4 and corresponding NICs N1-N4. The NIC drivers D1-D4 (and the NICs N1-N4) are bound as a single team 320 as shown in FIG. 2. Because each instance of the intermediate driver 310 can be used to combine two or more NIC drivers into a team, a user may configure multiple teams of any combination of the ports of those NICs currently installed on the computer system 100. By binding together two or more drivers corresponding to two or more ports of physical NICs, data can be routed through one port or the other or both, with the protocols interacting with what appears to be only one logical device.

"Transmit" load-balancing (TLB) teams of network resources typically employ two or more network adapter or NIC ports, one port being "active" and designated as the "primary," while each of the other members of the team are active and designated as "secondary." All active team members transmit data to the network, and only the primary member receives data from the network on behalf of the team. Thus, the throughput of the team is aggregated over all active members for transmitting data from the team to the network. Moreover, the traffic is balanced over the team members in accordance with some load-balancing algorithm implemented by the teaming mechanism. Only the member designated as the primary for the team receives data destined for the team because the team is identified on the network with a single team IP and single team MAC address, shared by all team members. Because each member of the team has its own unique MAC address, only the NIC port associated with the team MAC address can receive packets transmitted from other devices on the network. This does not pose a problem on the transmit side because the different source MAC addresses for the packets emanating from each individual team member are stripped from the packets as they are processed up the protocol stack of the receiving device. This one sided aggregation and load-balancing scheme can be acceptable for client/server applications because the amount of data being transmitted from the server to the clients is significantly greater than the data requests received from the clients.

Other schemes have been employed to provide load-balancing of receive traffic across the team. One such scheme is the "switch-assisted" load balancing (SLB) team. For a typical SLB team, data is balanced with the support of a specialized switch that is capable of performing load balancing algorithms on the data destined for the team. The switch directs packet traffic, all of which have the single team MAC address as their destination MAC address, to the different members of the team.

Figure 3A:
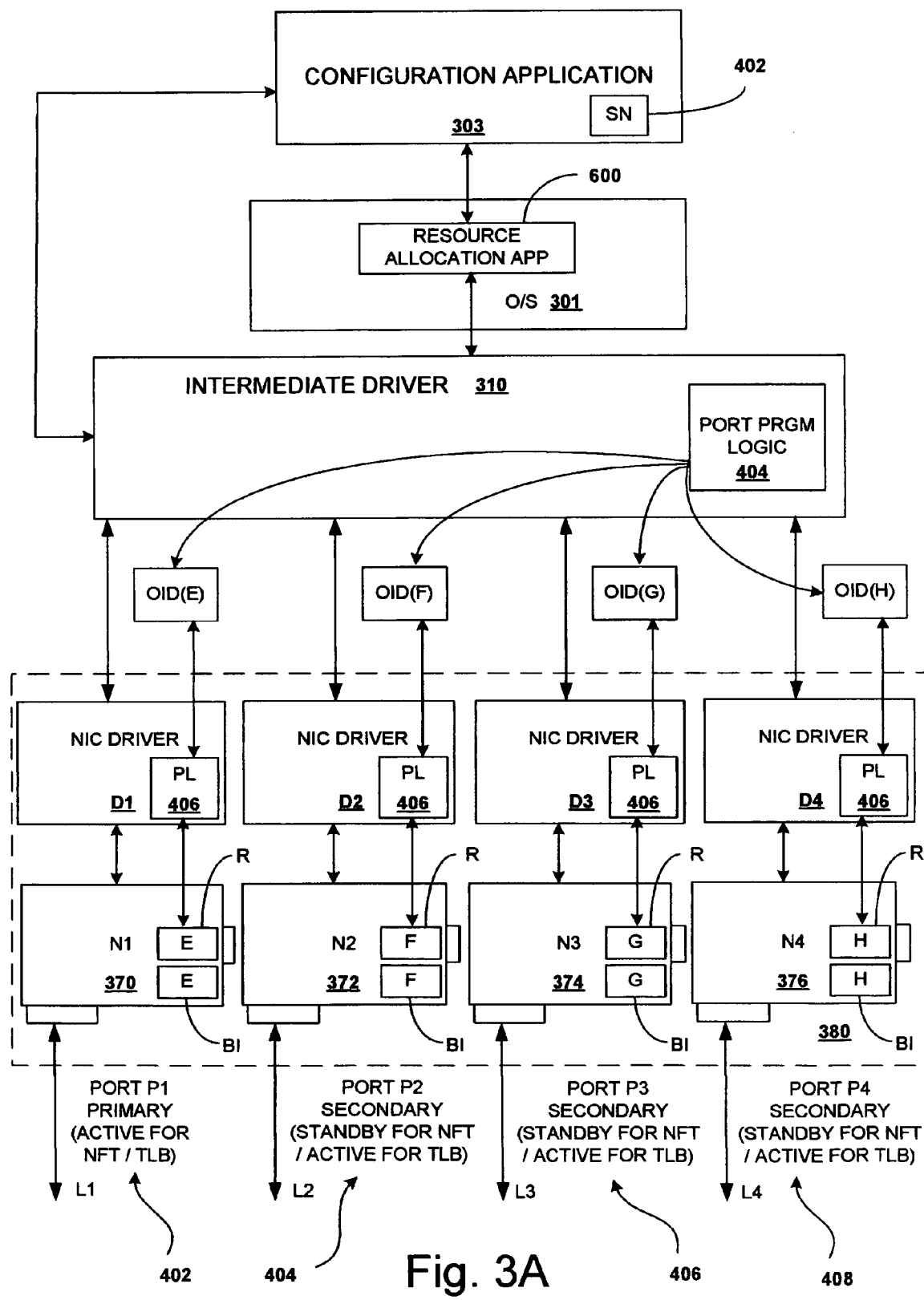
FIG. 3A is a block diagram illustrating network resources of the computer system of FIG. 1 configured as either an NFT or TLB team that may employ features of an embodiment of the invention.

FIG. 3A is a block diagram illustrating an embodiment of system 100 with four single-port NICs that have been configured either as a network fault tolerant (NFT) team (where each of the secondary devices have been placed in an inactive standby mode), or as a TLB team in which case the secondary members are active. An instantiation of the intermediate driver 310 is created for the team in response to commands from configuration application 303. Upon initialization, the instance of the teaming driver 310 for the team first reads the BIA (burned-in MAC address) for each member of its team. In the embodiment of FIG. 3A the factory assigned MAC addresses are referred to as E, F, G and H, respectively. The teaming driver then picks one MAC address from the team's pool of BIAs and assigns that to that adapter or NIC port it designates as primary for the team. In the example of FIG. 3A, port P1 402 is designated by the teaming driver 310 to be the primary port for the team and is assigned the MAC address for the team. The MAC address assigned to port P1 402 is then written to override register R and all of the remaining ports P2-P4 404, 406, 408 become secondary ports that are programmed with one of the remaining MAC addresses from the pool.

If the team is an NFT team, the secondary members of the team are initially placed in standby mode. If the team is a TLB team, the secondary members are placed in active mode just as in the case for the primary member. In either case, the MAC address assigned to the primary resource becomes the MAC address for the team, and for this reason only the primary resource will receive traffic destined for the team. Also for this reason, secondary members of the TLB team will be available to transmit data for the team in accordance with a load-balancing algorithm executed by the teaming driver 310. In the example, the MAC address assignments by the teaming driver 310 are the same as the BIAs for each member but this is not necessarily the case.

The teaming driver 310 includes port program logic 404 that can be used to command the NIC drivers D1-D4 to program the override register R of each of the NICs with the MAC address assignments from the pool. Each of the NIC drivers D1-D4 includes program logic 406 that receives a command, including the override receive address, from the port program logic 404 of the intermediate driver 310. The commands can be issued in the form of an Operation Identifier (OID) to each of the individual NIC drivers D1-D4. Standard NIC drivers are typically designed to recognize a plurality of standard OIDs that are usually sent from the upper level protocols. The override receive address OID used to program the receive address override register is not typically included as a standard OID.

Figure 3B:
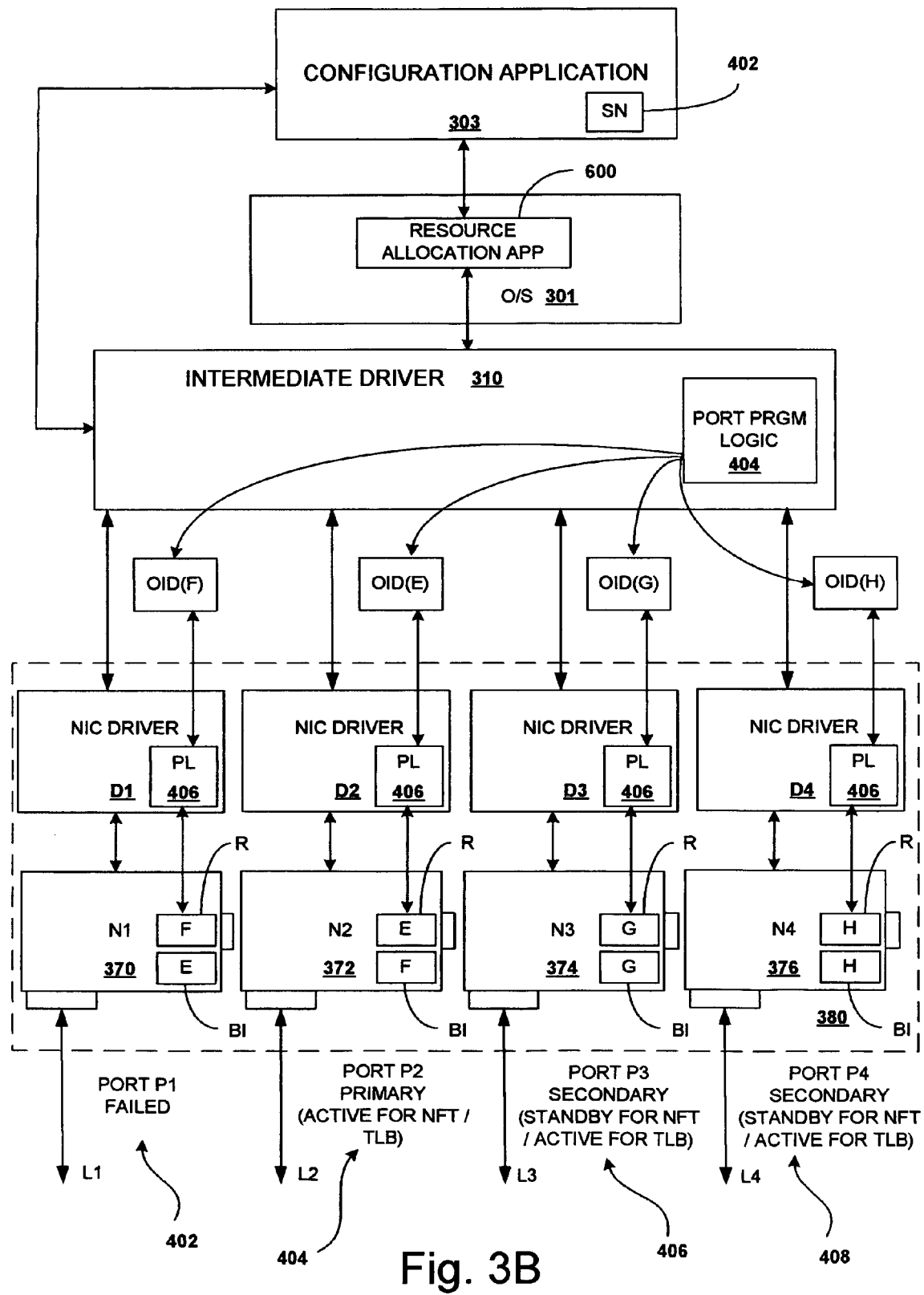
FIG. 3B is a block diagram of the NFT or TLB team of FIG. 3A after a failover has occurred.

If the currently active NIC port 402 becomes disabled or fails for any reason, a failover can be executed by the teaming driver 310 in response thereto whereby a secondary or standby port becomes the active and primary port. FIG. 3B illustrates the team of FIG. 3A after a failover. The MAC addresses between ports P1 402 and P2 404 have been swapped and port P2 404 becomes active and the primary for the team. This is accomplished by the teaming driver causing the team MAC address to be stored into the override register R of NIC 372 and the MAC address previously assigned to NIC 372 to be stored into the override register of the failed NIC 370. The NIC 370 providing port P1 402 is also placed in a standby mode and the failed status of the port P1 402 is communicated by the teaming driver 310 back to the configuration application 303. Likewise, the new status for the NIC 372 providing port P2 404 (e.g. as primary and active) is also sent to the configuration application 303. If the network device to which the team is coupled is a hub or a repeater, no other change is necessary. If the network device is a switch, the switch learns that the virtual device (i.e. the team) with source MAC address E has moved from link L1 to L2, and begins sending packets with destination MAC address E to the computer system 100 via the link L2.

Figure 4A:
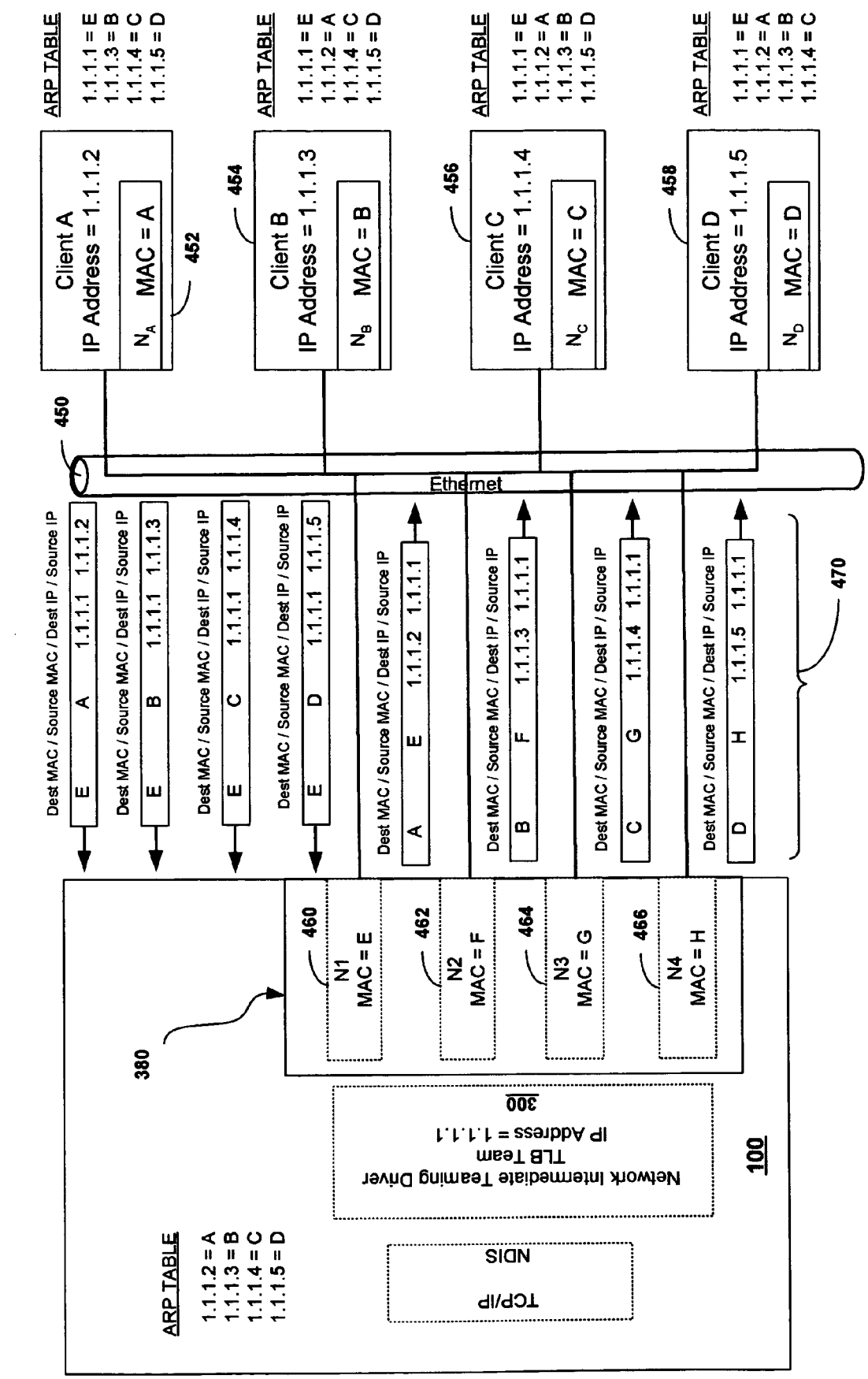
FIG. 4A is a block diagram illustrating a computer system having a TLB team of network resources and a possible load-balanced data flow to and from peer network devices.
Figure 4B:
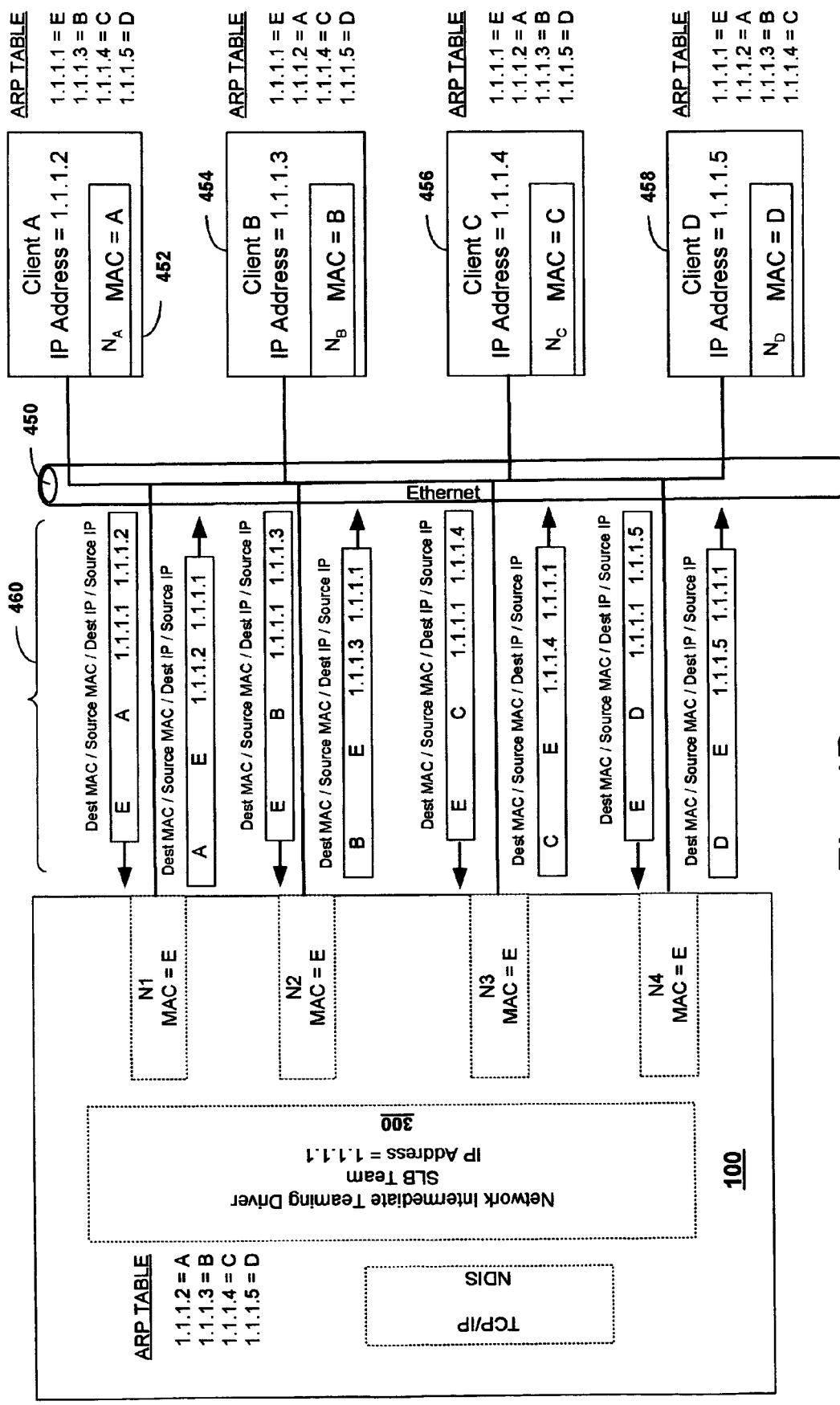
FIG. 4B is a block diagram illustrating a computer system having an SLB team of network resources and a possible load-balanced data flow to and from peer network devices.

FIG. 4A illustrates the team 380 residing in a server 100 and one possible distribution of traffic over the team of NICs configured as a TLB team in accordance with FIG. 3A. In this case, all traffic received by the team is through the NIC N1 370 because all such traffic has the team MAC address of E for its destination MAC address. Those of skill in the art will recognize that there are numerous known methods by which to balance the load of packets being transmitted by the TLB team 380, including for example by destination MAC or destination IP addresses. FIG. 4B illustrates the team 380 configured as a SLB team for which the load-balancing is performed by a switch. In this case, all adapters of the team 380 are assigned the team MAC address (e.g. MAC=E) and the switch (not shown) executes the load-balancing policy leading to a distribution of the receive traffic. The transmit side works the same as for a TLB team (e.g. FIG. 4A) except that the source MAC addresses are all that of the team MAC address. The load-balancing algorithms implemented by the switch for the receive traffic are similar to those of the transmit side implemented by the teaming driver 310.

For the reasons previously discussed, it would be desirable to provide point-to-point load-balancing (PPLB) on both the transmit and receive sides of each team, and without the need for specialized switches necessary to implement SLB load balancing. Embodiments of a technique for providing PPLB are disclosed in the U.S. patent application Ser. No. 10/917, 677 entitled "Receive Load Balancing on Multiple Network Adapters," filed Aug. 13, 2004 and which is incorporated herein in its entirety by this reference.

Figure 5:
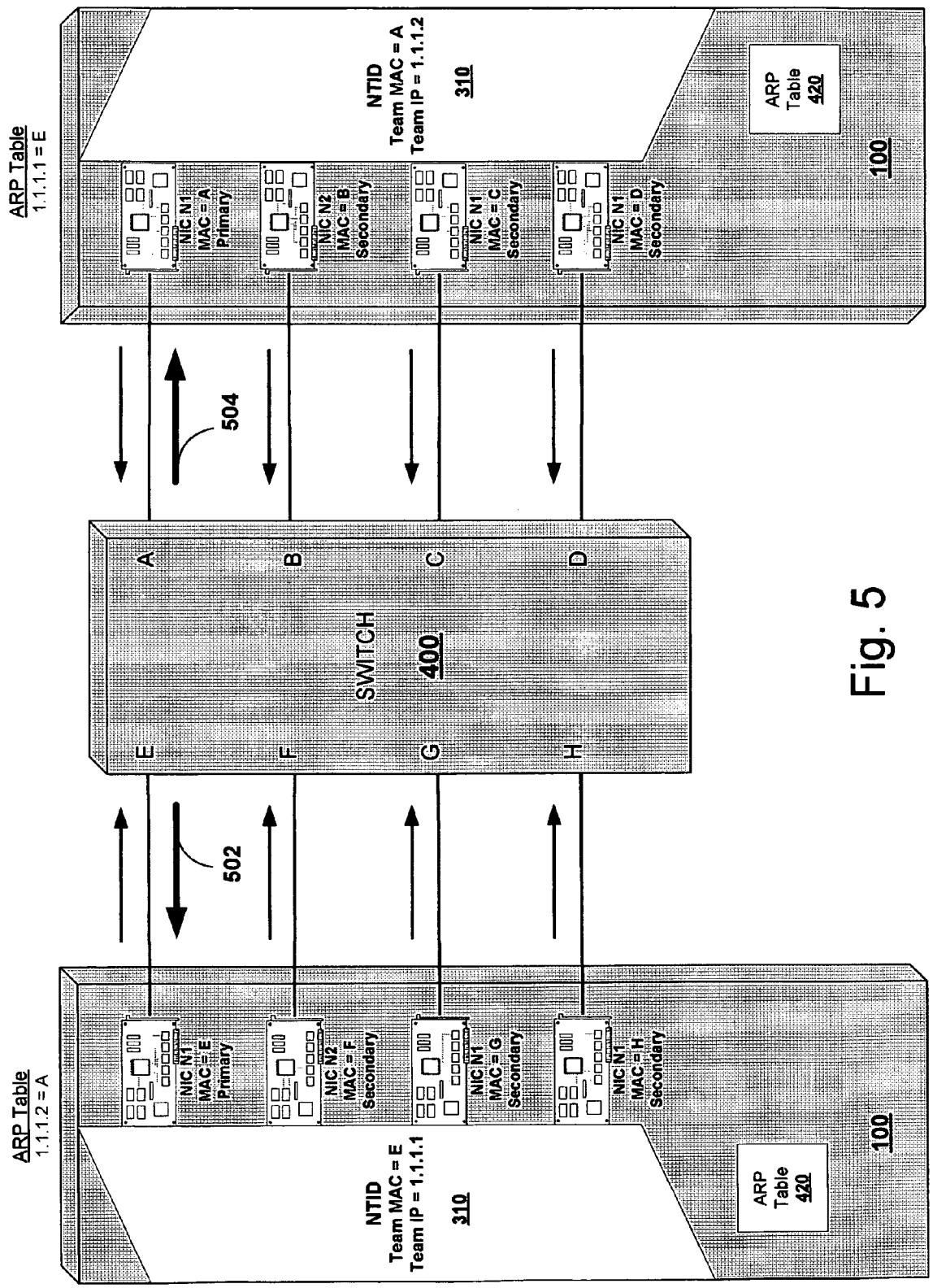
FIG. 5 is a block diagram illustrating two computer systems coupled over a local area network the network resources for each being configured as a TLB team.

FIG. 5 illustrates two servers 100 and 101 having TLB teams configured in accordance with FIG. 4A. As illustrated, only the transmit traffic from each server team is load-balanced over the entire team. Receive traffic 504 for sever 100 is aggregated from all of the transmitting team members of server 101 and received over the primary NIC N1 of server 100. Likewise, receive traffic 502 is aggregated and received over NIC N1 of server 101. The reason for this is that the paradigm for Ethernet addressing requires a one-to-one correspondence between a MAC address and an IP address. This is indicated by the content of the ARP table 402 maintained for each server and listed above the server blocks 100, 101. When the servers first ARP on the network to ascertain the MAC address for the other, they will each only receive the team MAC address for each other's team of resources.

Figure 6:
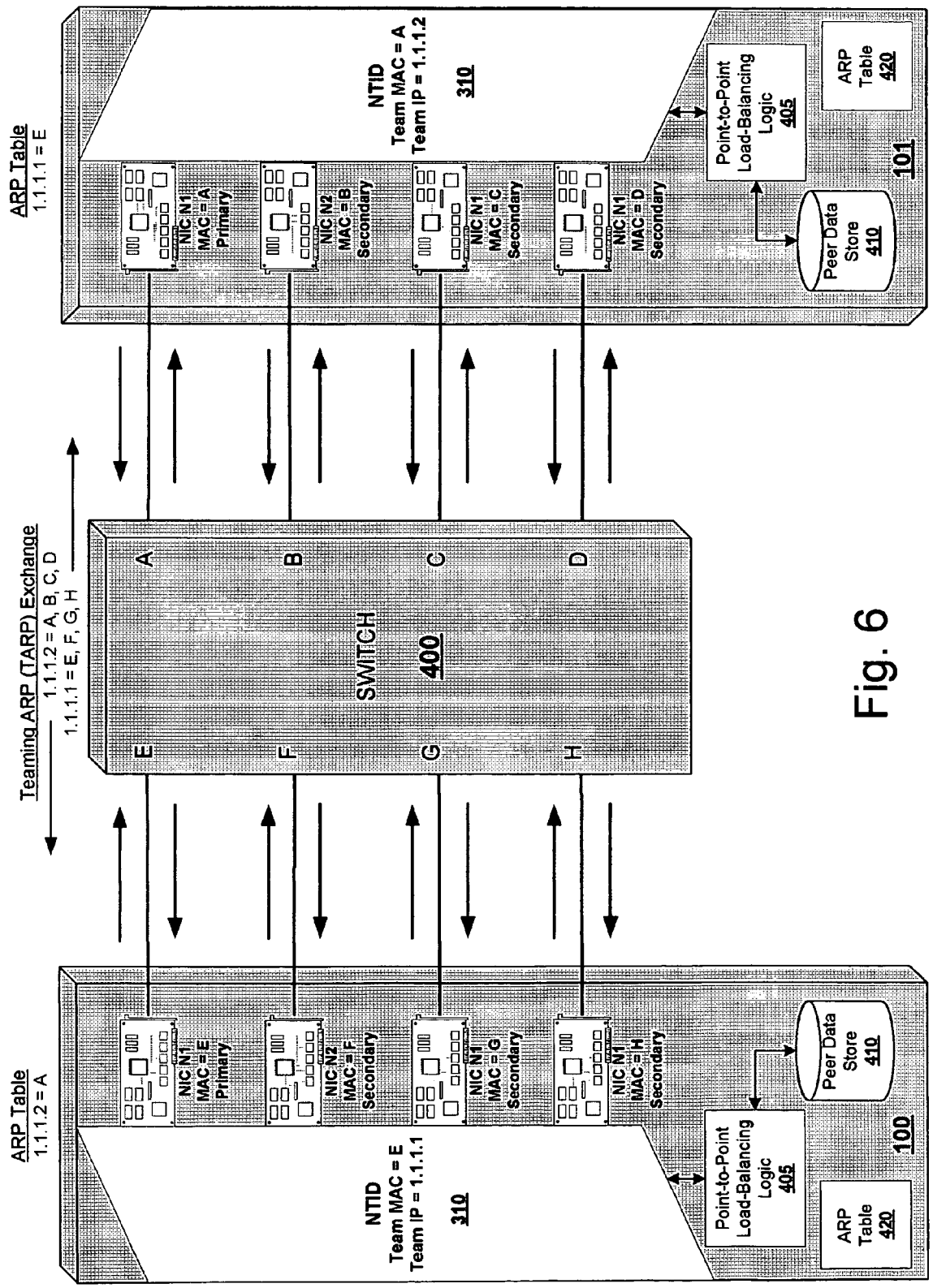
FIG. 6 is a block diagram illustrating two computer systems each having teams of network resources configured as TLB teams and employing point-to-point load-balancing in accordance with an embodiment of the present invention.

PPLB can free each team of this constraint by permitting the resources of each team to transmit to more than one destination MAC address for a given IP address, provided the team associated with that IP address is also PPLB enabled. The desired result of PPLB is illustrated in FIG. 6. To implement PPLB, each PPLB enabled server or device is coupled over the same local area network or network segment and consists of a database that is stored in peer data store 410 and load balancing logic 405. The database contains information about remote or peer PPLB teams and associated MAC addresses for each member of those teams. The PPLB logic 405 uses the information in the database to load-balance all traffic to a peer PPLB team by altering the destination MAC address in the frames transmitted to the peer PPLB teams to destination MAC addresses of individual team members rather than just the team MAC address as in the case of the TLB team for example. Because individual destination MAC addresses for individual members of the peer team are used to reach the peer PPLB team, the peer server will receive on multiple ports of the team, thereby achieving receive load-balancing over the individual members of the team.

PPLB can therefore predictably affect how frames are transmitted by the switch 400 and, therefore, how they are received at the destination peer. In other words, PPLB influences switch-to-destination traffic patterns in order to achieve receive load-balancing on the destination. This differs from SLB load-balancing in that for an SLB team, where it is the switch that determines the switch to destination traffic patterns. PPLB permits a transmitting team or a single NIC team to load balance to a destination peer based on the receiving team's configuration criteria (e.g. the PPLB logic 405 can calculate which destination MAC to use based on the destination's port speeds).

Figure 7A:
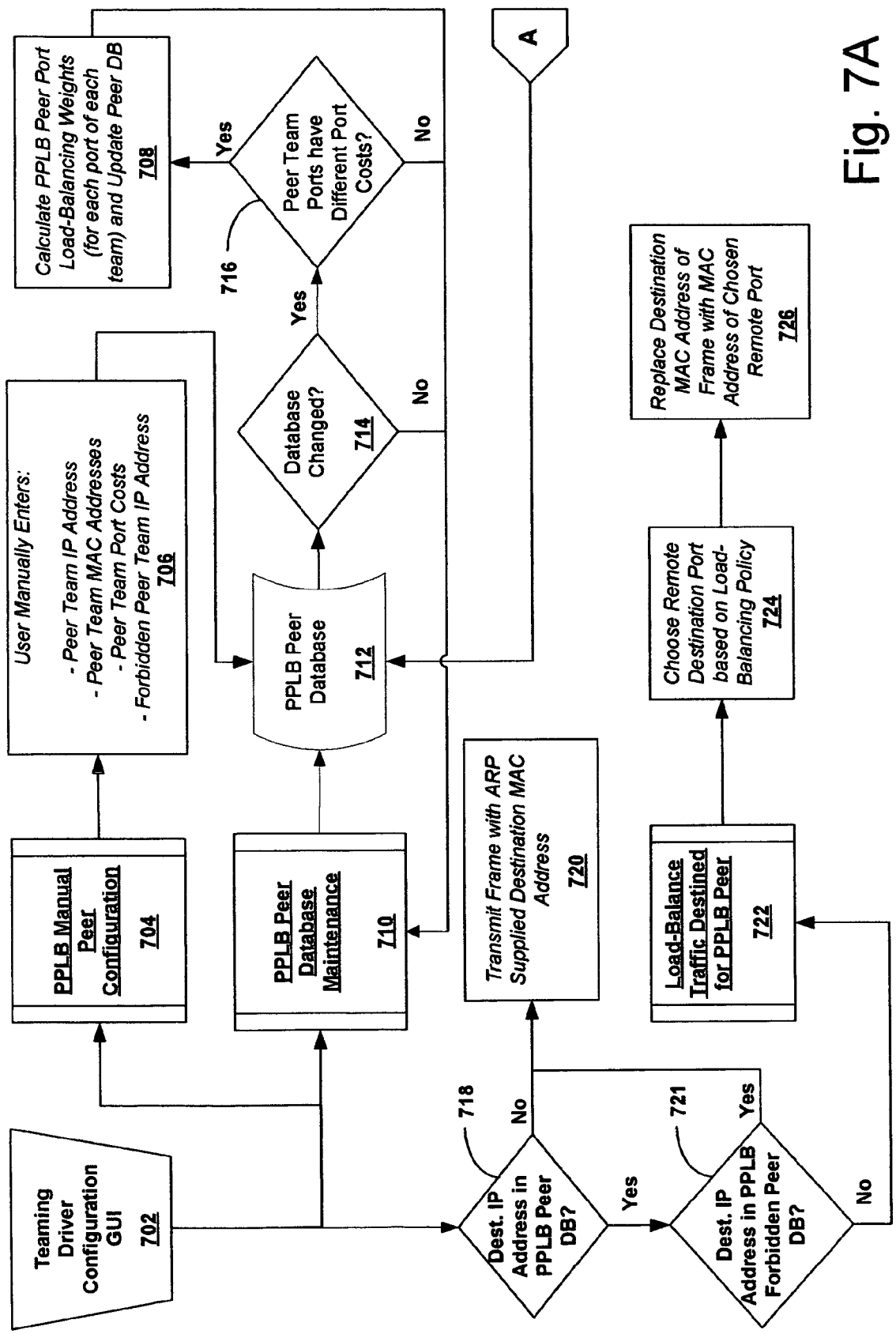
FIGS. 7A-7B forms a procedural flow diagram illustrating an embodiment of an automated PPLB process in accordance with an embodiment of the present invention.

FIG. 7A illustrates a flow-chart describing the flow of the PPLB technique as disclosed in the above-referenced patent application. First at data input block 702, PPLB is enabled for a local server containing a team that will be a source for transmitted data to remote peer PPLB enabled teams. This can be accomplished through the GUI provided by configuration application 303 as previously described for configuring the team through the teaming driver 310. At 704, PPLB is configured manually through the GUI by inputting the IP addresses for remote peer PPLB enabled teams, the MAC addresses for each port of those remote peer teams, costs established with each port (e.g. the cost of each port of the peer team as dictated by Spanning Tree) and the IP addresses for any peer teams that are forbidden from being treated as PPLB destinations. This is indicated by the data block 706. The data is then stored as a database in peer data store 410 at block 712. Each PPLB enabled peer on the network is enabled in the same manner as described above.

This database PPLB peer information is managed by PPLB logic 405 for each PPLB peer at block 710. Should the peer data for one or more of the peer teams change by way of inputs to the configuration program 303 (whether as a result of the initial configuration or subsequent modification) the changes are detected by PPLB logic 405 at 714. Processing proceeds to block 716 where it is determined whether port costs (e.g. costs attributed by Spanning Tree) are different for the ports of any of the peer PPLB teams. If yes, load-balancing weights are calculated at block 718 for each port of such a team based on the cost information provided for each of the ports of the peer PPLB team. If the port costs are the same for each port of a PPLB team, then no load-balancing weights need be attributed to the ports because they are each weighed equally. A detailed explanation of an embodiment for calculating relative load-balancing weights based on cost information attributed to the individual ports of a team is disclosed in the above-referenced patent application.

With reference to FIG. 6, once PPLB has been enabled for each server 100, 101 as described above, the peer data store 410 for server 100 will contain PPLB peer data for server 101 (and all other PPLB peer devices on the network) that includes the IP address=1.1.1.2 of server 101 and the four MAC addresses A, B, C, and D assigned to the four ports for server 101, as well as cost attributes for each of the ports of the team of server 101. If those cost attributes are not identical over all four ports, load-balancing weights are calculated for each of the ports based on the attributed cost information. The same is true for the peer data store 410 of server 101, which contains PPLB peer data for server 100 including the IP address=1.1.1.1, the four MAC addresses=E, F, G, H, and the costs attributed to the four ports of the peer team of server 100. Also, if the cost attributes are not identical for the four ports of the peer team, the peer data store 410 will also contain relative load-balancing weights calculated for each of the ports based on the disparate cost attributes. Just as in the case of the conventional TLB team, each PPLB team still responds to an ARP request from a peer device with a team MAC address corresponding to a primary NIC (e.g. NIC N1 for both servers 100, 101 in FIGS. 6 and 7). Thus the ARP table 420 for each server still reflects the team IP and team MAC addresses for its respective PPLB enabled peer team.

In an embodiment, data packets to be transmitted from server 100 to server 101 for example are first generated by a protocol stack (e.g. TCP/IP 302, FIG. 2) protocol stack of server 100 and provided to its teaming driver 310 specifying the team IP and MAC destination addresses of the peer PPLB team of server 101. If the PPLB logic 405 of server 100 then detects at block 718, FIG. 7A that a packet containing the destination 1P address for PPLB peer server 101 (i.e. 1.1.1.2) is to be transmitted and finds that IP address is currently contained in the peer database stored in peer data store 410 processing continues at decision 721. If the destination IP address is not included in the database at 718, or if it is determined at 721 that the destination IP address of the packet is included in the list of forbidden peer team IP addresses of the peer database, then processing continues at block 720 where the packet is transmitted conventionally using the team MAC address for server 101.

If the destination IP address is part of the peer database at 718 and not part of the list of forbidden peer team IP addresses in the peer database at 721, then processing continues at block 722 representing the load-balancing process. Processing proceeds at block 724 where one of the ports is chosen, identified by its assigned MAC address from the peer data base. The choice of port is made based on some load-balancing policy implemented by the PPLB logic 405. Detailed embodiments of implemented policies for choosing the port of the peer PPLB team that will receive the packet are described in the above-referenced patent application. If the ports all have the same weight, the policy can be a simple round-robin technique that increments through the available ports one packet at a time. A more complex policy, the features of which are disclosed in the above-referenced application, can be implemented using the calculated weights for the ports when their respective cost attributes are different, thereby skewing more packets to those ports having a lower cost and therefore higher relative weight. Once the appropriate port has been chosen, processing continues at block 726 where the MAC address for that port is then substituted for the team MAC address currently found in the MAC destination address field of the packet.

Those of skill in the art will recognize that the PPLB enabled team for server 100 is still able to load-balance the transmit packets among its four ports (i.e. choose which of its ports will actually transmit the altered packet from block 726 based upon conventional TLB load-balancing policies. Moreover, the PPLB logic 405 permits the team to default to standard TLB team operation when transmitting to a peer device that is forbidden or not PPLB enabled.

Those of skill in the art will also recognize that it would be highly desirable for the invention to initially configure all PPLB enabled devices automatically, as well as to automatically re-configure whenever the configuration of one of the peer teams on the network has been altered. For example, in accordance with an embodiment as described in FIG. 7A, a user must know the configuration of all peer PPLB teams coupled over the same local area network, configuring each device individually through that device's configuration program 303 or equivalent thereof. Moreover, if one of the peer teams is reconfigured after initial configuration (e.g. additional ports are added to the team, NICs with greater bandwidth are added, or even additional PPLB enabled peers are added to the network, etc.), manual intervention is required on the part of a network administrator to update the peer databases of each of the other peer devices on the network, or they may not operate properly.

Figure 7B:
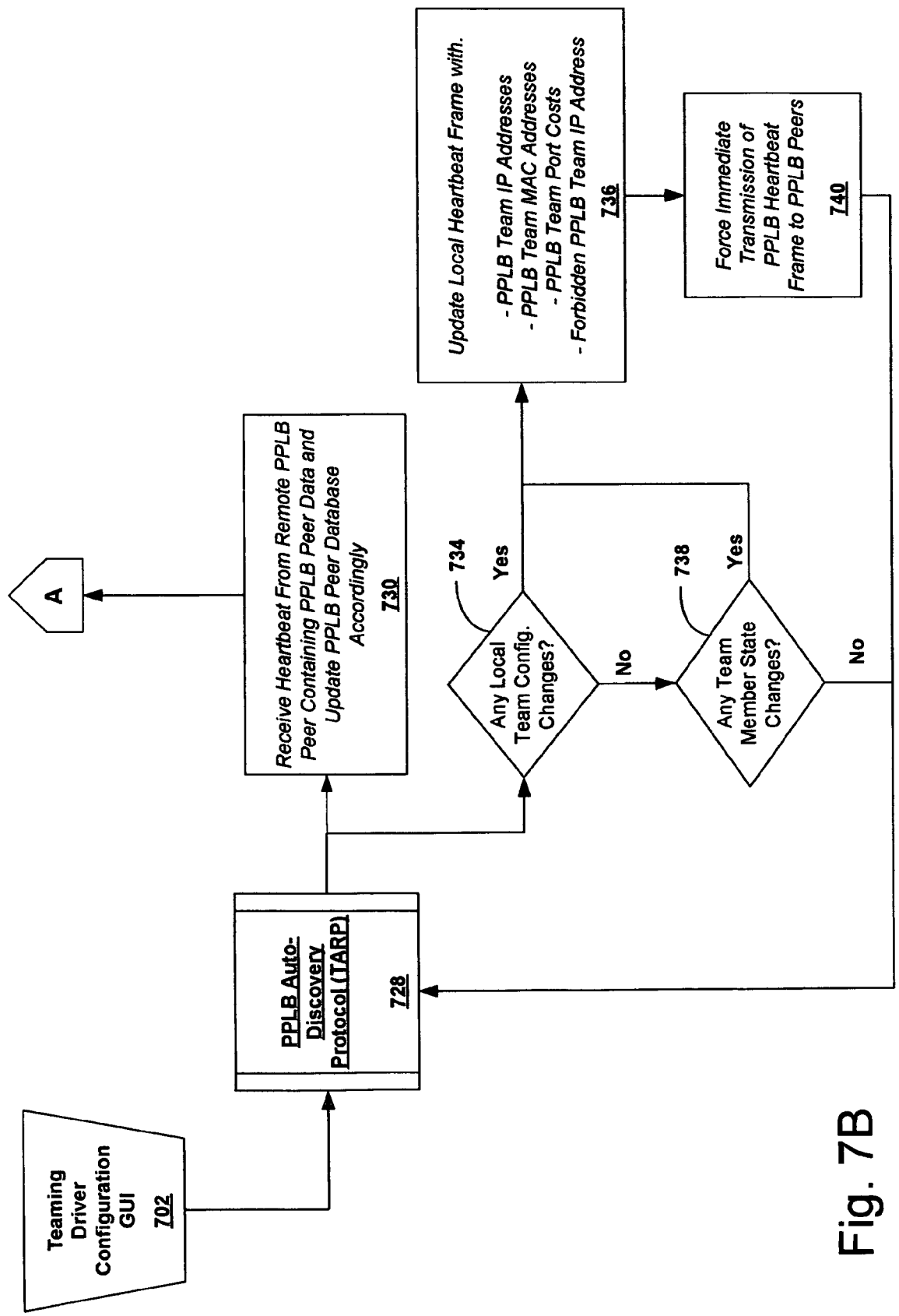

An embodiment of the invention is disclosed with reference to FIG. 7B in conjunction with the foregoing in which PPLB that facilitates automatically configured by the PPLB peers of the network automatically, and through which such devices are able to automatically reconfigure themselves based on the reconfiguration of any of the peer teams or the addition or deletion of peer teams. In an embodiment, the PPLB logic 405 of all PPLB enabled peers receive multicast frames at 730 of FIG. 7B that contain the PPLB peer data for each of the PPLB peers and have as a destination address a multicast address that is recognized by all of the other PPLB peers on the network. This PPLB peer data can include each IP address of the other PPLB peers, the MAC addresses assigned to each port of the other peer teams on the local area network, and the cost attributes for each port of each of the other the peer teams. Peer devices on the network for which PPLB is forbidden also transmit their IP address and their forbidden status in a frame to be received and stored by all PPLB enabled peers. The data is extracted by the PPLB logic 405 of each PPLB peer and updated to its peer data store 410 at block 712 as indicated by connector "A" from FIG. 7B to FIG. 7A. The peer data is then used in implementing PPLB as previously described above with reference to FIG. 7A.

The PPLB logic 405 of each PPLB enabled peer further monitors its own configuration for changes (including initial configuration) at block 734, or changes in the operative state of any of the ports of the peer team (e.g. failed, standby, etc.) at block 738. If such changes are detected at either 734 or 738, processing proceeds to block 736 where the data frame for that PPLB peer device is updated with the changes necessary to reflect the detected changes. An updated data frame is immediately multicast to the remaining PPLB peers on the network at block 740. The other PPLB peers receive the new data frame at block 730 and update the data in their peer data stores at block 712 of FIG. 7A. Once again, the PPLB logic 405 of each PPLB peer operates in the manner previously described with respect to FIG. 7A.

The PPLB peer data transmitted by each PPLB enabled device on the network can be a special packet specifically for that purpose. In another embodiment, the PPLB peer data can be embedded within a packet that is already being multicast to the other devices on the network. One such packet is called a heartbeat packet. Heartbeat packets are transmitted on a periodic basis by the various team members of peer teams on the network to monitor their operational status. By embedding the PPLB peer data within the heartbeat packets, no additional packet traffic is added to the network than is already present. Those of skill in the art will recognize that such data can also be embedded within other packets that are multicast to an address that all PPLB peer devices are sure to receive.

What is claimed is:

1. A method of automatically configuring a point-to-point load balancing for each of a plurality of peer network devices to load-balance data transmitted therebetween on a point-by-point basis, each peer device comprising a team of network resources coupling it to a local area network, the transmitting one of the peer devices load-balancing the data to be transferred over its team of resources as well as the team of resources comprising the receiving one of the plurality, said method comprising:
   multicasting a data frame from each of the peer devices to the other peer devices of the plurality, the data frame comprising peer data defining attributes of the team of the multicasting peer device; and
   updating the multicast data frame with new peer data whenever one or more of the attributes of the team of the multicasting peer device are changed.

2. The method of claim 1 wherein those teams of the peer devices that comprise a plurality of network resources are configured as transmit load-balancing (TLB) teams.

3. The method of claim 1 wherein the peer data comprises an IP address identifying the team comprising the multicasting peer device and MAC addresses uniquely assigned each of the network resources comprising the team of the multicasting peer device.

4. The method of claim 3 wherein the peer data further comprises cost attributes associated with each of the network resources comprising the team of the multicasting peer device.

5. The method of claim 1 wherein the data frame is periodically multicast by the peer devices for purposes other than load-balancing, and the peer data is embedded therein.

6. The method of claim 5 wherein the data frame is multicast by a peer device immediately after the multicasting peer device updates the data frame, notwithstanding the periodicity of the data frame transmission.

7. The method of claim 5 wherein the data frame comprises a heartbeat packet used to monitor operability of each of the peer devices' team of resources.

8. The method of claim 1 wherein said updating further comprises monitoring the team of the multicasting peer device for a change in its configuration attributes and altering the peer data to reflect any such change.

9. The method of claim 1 wherein said updating further comprises monitoring the team of the multicasting peer device for changes in the operational status of each of the network resources comprising its team and altering the peer data to reflect any such change.

10. The method of claim 1 further comprising:
    receiving the data frames at each peer device multicast by the other peer devices;
    storing the peer data at the receiving peer device extracted from the received frames for each of the other peer devices as a peer database; and
    load-balancing data transmitted from one of the peer devices to one of the other peer devices using the peer data comprising the peer database that was received from the other peer device.

11. A network device comprising a team of network resources and coupled to one or more peer network devices over a local area network, said network device operable to automatically configure a point-to-point load balancing for the one or more peer devices to load-balance over its team of network resources data they transmit to said network device, said device further comprising:
    means for multicasting a data frame to the one or more peer devices, the data frame comprising peer data defining attributes of the network device's team of resources; and
    means for updating the multicast data frame with new peer data whenever one or more attributes of the network device's team of resources are altered.

12. The network device of claim 11 wherein the one or more peer devices comprise a team of network resources configured as a transmit load-balancing (TLB) team.

13. The network device of claim 11 wherein the peer data comprising the multicast data frame comprises an IP address identifying its team of network resources, and MAC addresses uniquely assigned to each of the network resources of the team.

14. The network device of claim 13 wherein the peer data comprising the multicast data frame further comprises cost attributes associated with each of the network resources of its team.

15. The network device of claim 11 wherein the data frame is one that is periodically multicast by the device for purposes other than load-balancing, and the peer data is embedded therein.

16. The network device of claim 15 wherein the data frame is multicast by the device immediately after the device updates the data frame, notwithstanding the periodicity of the data frame.

17. The network device of claim 15 wherein the data frame comprises a heartbeat packet used to monitor operability of each its team of resources.

18. The network device of claim 11 wherein said means for updating further comprises means for monitoring its team for a change in configuration attributes and alters the peer data to reflect any such change.

19. The network device of claim 11 wherein said means for updating further comprises means for monitoring its team for changes in operational status of each of the network resources comprising the team and altering the peer data to reflect any such change.

20. The network device of claim 11 wherein said device is further operable to be configured automatically to load-balance data it transmits to the one or more peer devices over their respective teams of network resources, said device further comprising:
    means for receiving multicast data frames from the one or more peer devices; and
    means for storing the peer data comprising the multicast data frames for each of the one or more peer devices as a peer database.

21. The network device of claim 20 further comprising means for load-balancing data transmitted to the one or more peer devices over their respective teams of resources based on their peer data stored in the peer database.

22. A method of automatically configuring a point-to-point load balancing for one or more peer network devices to load-balance data they transmit to a receiving network device over a local area network, the transmitted data being load-balanced by the transmitting peer device over a team of network resources comprising the receiving network device, the method further comprising:
    multicasting a data frame from the receiving device to the one or more peer devices, the data frame comprising peer data defining one or more attributes of the team of network resources comprising the receiving device; and
    updating the multicast data frame with new peer data whenever at least one of the one or more attributes of the receiving device's team of resources is altered.

23. The method of claim 22 wherein the transmitting peer device's team of resources is initially configured as transmit load-balancing (TLB) team, and the data it transmits to the receiving device is load-balanced over its team of resources as well.

24. The method of claim 22 wherein the data frame is one that is periodically multicast by the receiving device for purposes other than load-balancing, and the peer data is embedded therein.

25. The method of claim 24 wherein the data frame is multicast by the receiving device immediately after the device updates the data frame, notwithstanding the periodicity of the data frame.

26. The method of claim 24 wherein the data frame comprises a heartbeat packet used to monitor operability of each of the receiving device's team of resources.

27. A method of automatically configuring a point to point load balancing for a network device to load-balance data it transmits over a local area network to one or more peer devices, the data being load-balanced over a team of network resources comprising each of the one or more peer devices, said method comprising:
    receiving data frames at the network device that are multicast by the one or more peer devices, each of the data frames comprising peer data defining one or more attributes of the team comprising the multicasting peer device; and
    storing at the network device peer data from the received data frames for each of the one or more multicasting peer devices.

28. The method of claim 27 wherein the stored peer data for the multicasting peer device comprises an IP address identifying the team of resources comprising the multicasting peer device, and a MAC address uniquely assigned to each of the network resources of the team.

29. The method of claim 27 further comprising load-balancing data transmitted by the network device to the multicasting peer device over the team of resources comprising the multicasting peer device in accordance with the stored peer data for the multicasting peer device.

30. The method of claim 28 wherein data frames to be transmitted to one of the one or more peer devices comprises a destination MAC address identifying a primary member of its team of resources, the method further comprising:
    for each data frame to be transmitted by the network device to one of the one or more peer devices:
        selecting one of the MAC addresses comprising the stored peer data for the one of the one or more peer devices in accordance with a load-balancing policy; and
        replacing the primary MAC address in the data frame with the selected one of the assigned MAC addresses prior to transmitting the frame.

31. A network device operable to be automatically configured for point-to-point load balancing to load-balance data it transmits over a local area network to one or more peer devices, the data being load-balanced over a team of network resources comprising each of the one or more peer devices, said network device comprising:
    means for receiving data frames that are multicast by each of the one or more peer devices, the data frames comprising peer data defining current attributes for the team of the multicasting one of the one or more peer devices; and
    means for storing the peer data comprising the received data frames for each of the one or more peer devices as a peer database.

* * * * *